United States Patent Office 3,449,259
Patented June 10, 1969

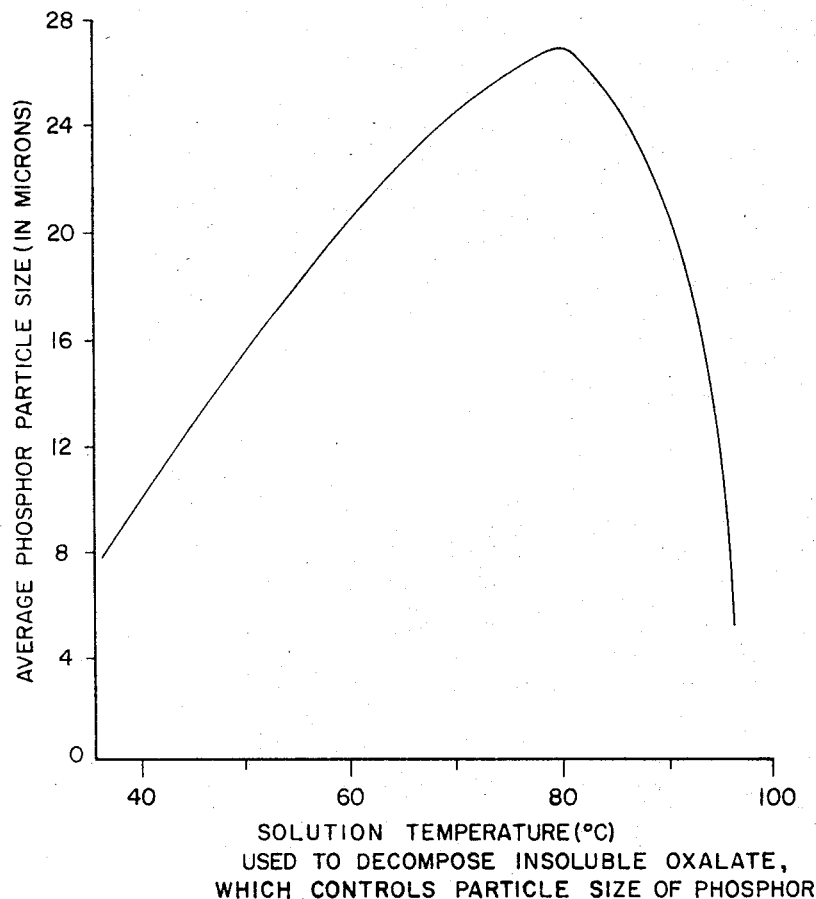

3,449,259
METHOD OF MAKING PHOSPHOR RAW-MIX
MATERIALS AND PHOSPHORS
Richard C. Ropp, North Caldwell, N.J., assignor to Westinghouse Electric Corporation, Pittsburgh, Pa., a corporation of Pennsylvania
Filed Nov. 17, 1965, Ser. No. 508,222
Int. Cl. C09k 1/04
U.S. Cl. 252—301.4    10 Claims

ABSTRACT OF THE DISCLOSURE

The particle size of phosphor having oxide of one or more of yttrium, lanthanum or gadolinium as matrix and activated by oxide of one or more of samarium, europium, terbium, dysprosium, neodymium, holmium, erbium, praseodymium or thulium, can be carefully controlled by controlling the particle size of the raw mix used to prepare the phosphor. To control the particle size of the raw mix during preparation of same, an aqueous solution of compound of the phosphor matrix metal is mixed with an aqueous solution of compound of the phosphor activator metal. To this mixed solution is added a normally insoluble oxalate, which when heated slowly decomposes in the presence of water to form soluble oxalate. This in turn precipitates the phosphor raw-mix constituents as oxalates. The temperature of the mixed solution, during precipitation, controls the particle size of the resulting raw-mix precipitated oxalates, which precipitate is fired to form the phosphor.

---

This invention generally relates to phosphor materials and, more particularly, to methods for making raw-mix materials for phosphors as well as the phosphors made therefrom.

It is known that the particle size of phosphor materials should be carefully controlled in order to obtain best performance of the phosphor. As an example, for use with fluorescent lamps, it is desirable that the particle sizes of some phosphors fall within the range of from 3 to 30 microns. If a phosphor is to be used in color-television screens, it is normally desirable that the phosphor particle diameter fall within the range of from 2 to 20 microns. It is also desirable to minimize the tendency of finely divided phosphor materials to agglomerate.

Phosphor materials which comprise europium-activated yttrium oxide or europium-activated gadolinium oxide are known to be particularly useful in conjunction with fluorescent lamps and color television cathode-ray tubes. Such phosphors are disclosed in copending application, Ser. No. 474,102, filed July 22, 1965, and owned by the present assignee. It is very desirable to be able to control very accurately the particle size of these and related phosphors by carefully controlling the preparation of the raw-mix material used to prepare the phosphor.

It is the general object of this invention to provide a method for making phosphor raw-mix material which enables the particle size of the raw-mix material and of the finished phosphor to be carefully controlled.

It is another object to provide a method for making raw-mix material for phosphors wherein the finished phosphor material made from the prepared raw-mix material has a minimum of agglomerated particles.

It is a further object to provide a method for making phosphor raw-mix material wherein the preparation of the material can be very carefully controlled which results in reproducibility of the phosphor prepared from the raw-mix material.

The foregoing objects of the invention, and other objects which will become apparent as the description proceeds, are achieved by providing a method of forming raw-mix material for use in preparing a phosphor wherein the formed raw-mix material is one or more of metal oxalate of the first group consisting of lanthanum oxalate, yttrium oxalate or gadolinium oxalate, together with a small amount of metal oxalate of one of the second group consisting of samarium oxalate, europium oxalate, terbium oxalate, dysprosium oxalate, neodymium oxalate, holmium oxalate, erbium oxalate, praseodymium oxalate or thulium oxalate. In preparing this raw-mix material, there is formed an aqueous solution of compound including the metal component of the first group together with a solution of compound which includes the metal component of the second group, with the relative gram-atom proportions of the metal in the solution carefully controlled. In one method for precipitating the desired metals as oxalates from the solution, there is added to the solution, when it is at a temperature less than 40° C., a predetermined amount of insoluble oxalate which in the presence of water slowly decomposes at relatively elevated temperatures to form a soluble oxalate. The temperature of the solution is then raised an amount sufficient to cause the insoluble oxalate to slowly decompose, and thereby form the soluble oxalate at a controlled rate. Upon formation of the soluble oxalate, this reacts with the metallic ions in the solution in order to precipitate the metallic constituents of the phosphor raw mix as coprecipitated oxalates. Thereafter, the precipitate is dried. The particle size of the precipitated oxalates, which controls the particle size of the finished phosphor, is readily controlled by controlling the temperature at which the metallic oxalates are coprecipitated.

In a second method, the aqueous solution is formed as before, but is heated to a temperature of from 40° C. to about 95° C. There is then added to this solution the insoluble oxalate which in the presence of the water slowly decomposes to form soluble oxalate. Upon the formation of the soluble oxalate, the desired metals are coprecipitated from the solution as oxalates.

For a better understanding of the invention, reference should be made to the sole figure of the accompanying drawing which sets forth a graph of average phosphor particle size versus solution temperature during oxalate precipitation.

EXAMPLE I

In practicing the present method, a predetermined amount of the major metallic constituent of the phosphor matrix, along with a predetermined proportion of the activator metal of the phosphor, are incorporated into an aqueous solution. As an example, 45.16 grams of yttrium oxide ($Y_2O_3$) and 5.28 grams of europium oxide ($Eu_2O_3$) are dissolved in 90 cc. of concentrated nitric acid. The resulting solution is then diluted to one liter and cooled to room temperature. There is then added to the solution 57 cc. of diethyl oxalate and the mixture is stirred together by shaking. At room temperature, the diethyl oxalate is substantially insoluble and relatively stable in aqueous solutions, but at higher temperatures, such as 40° C. to 95° C., it will slowly decompose to form oxalic acid and ethyl alcohol. The solution is then heated to a temperature of 40° C., for example, and permitted to remain at this temperature for a period of one hour. The diethyl oxalate will slowly decompose and upon formation of oxalic acid, the metallic constituents within the solution are coprecipitated as oxalates. Upon complete precipitation, the precipitate is separated, dried, and fired two hours at a temperature of 1360° C. in an air atmosphere to form the phosphor. The resulting phosphor emission is bright red under excitation by ultraviolet (2537 A.U.) and by cathode rays. The phosphor has an average particle size of 10 microns with the smallest particles having a diameter of 3 microns and the largest particles having a diameter of 60 microns.

While the foregoing example has considered in detail a europium-activated yttrium oxide phosphor, it should be understood that lanthanum oxide or gadolinium oxide or any mixtures thereof can be initially dissolved in place of the yttrium oxide in forming the nitrate solution. Alternatively, mixed yttrium, lanthanum, and gadolinium nitrates can be incorporated in any relative proportions into the initial nitrate solution.

As an example, 65.2 grams of lanthanum oxide or 72.5 grams of gadolinium oxide can be substituted for the yttrium oxide in forming the initial nitrate solution. Alternatively, the europium oxide in the foregoing example can be replaced by 0.035 gram of samarium oxide, 0.37 gram of terbium oxide, 0.037 gram of dysprosium oxide, 0.067 gram of neodymium oxide, 0.038 gram of holmium oxide, 0.039 gram of erbium oxide, 0.033 gram of praseodymium oxide, or 0.39 gram of thulium oxide, or by any mixture of any of the foregoing oxides. Also, mixtures of the rare-earth activator metals can be incorporated into the initial solution in any relative proportions.

The total gram-atoms of the metals lanthanum, yttrium and gadolinium, as initially placed into the solution, and the gram-atoms of the activators europium, etc., as incorporated into the solution, will determine the relative proportions of these metals in the precipitated phosphor raw mix and in the final phosphor. The gram-atom ratio of the principal matrix metal components relative to the activator metal components in the solution should be from 1:0.005 to 1:01.

EXAMPLE II

As a second example, the steps as given in the Example I are repeated, but the solution temperature is raised from room temperature to 30° C. and held at this temperature for 5 minutes to induce nucleation of the particles, prior to complete precipitation. The final temperature used for precipitation is the same, that is, from 40° C. to 95° C. If the final precipitating temperature is 60° C., the average particle size of the phosphor is 22 microns, but the distribution of particle sizes will range from 1.5 microns at the lower end to 48 microns at the upper end.

EXAMPLE III

As a third example, 72.5 grams of gadolinium oxide and 3.87 grams of europium oxide are dissolved in 90 cc. of concentrated nitric acid, with the resulting solution diluted to one liter. The remainder of the process steps as outlined in Example I are then followed and a bright red phosphor will result, which phosphor has the same particle size characteristics as outlined under Example I.

EXAMPLE IV

As a fourth example, the dissolution step is carried out as outlined under Example II or Example III but the diethyl oxalate is added to the nitrate solution after the solution has been heated to a temperature of 40° C., for example. In this case, an average size of 16.9 microns is obtained with the largest particles having a diameter of 60 microns and the smallest particles having a diameter of 3 microns. The particles are considerably agglomerated, however, even though they are extremely crystalline in nature. If the phosphor raw-mix materials and the phosphors made therefrom are prepared in accordance with Examples I, II and III, the tendency toward agglomeration is minimized.

The average particle size of the phosphor as prepared substantially corresponds to the average particle size of the precipitated oxalate, within the limits of experimental error, and the particle size distribution above and below the average particle size is similar to the raw mix and in the prepared phosphor. There is shown in the sole figure of the drawing a graph wherein the average particle size of the prepared phosphor is plotted versus the precipitation temperature at which the initial solution and diethyl oxalate are maintained. Thus, depending upon the final intended use of the phosphor, such as fluorescent lamps or in cathode ray tubes, the average particle size of the phosphor can be varied and tailored for the intended use. For use in fluorescent lamps, the precipitating temperature preferably is about 75° C., and for use in cathode ray tubes, the precipitating temperature preferably is about 65° C. While the graph shown in the sole figure is for europium-activated yttrium oxide phosphor, a similar curve will apply for all of the phosphor embodiments described hereinbefore.

In the preferred method for practicing the invention, the diethyl oxalate is added to the nitrate solution when the solution is at room temperature. Thereafter, the solution desirably is digested at a temperature of between about 25° C. to 40° C. for at least about two minutes in order to promote nucleation of the particles. The solution is then heated to a temperature of from 40° C. to about 95° C. which causes the insoluble diethyl oxalate to slowly decompose to form ethyl alcohol and oxalic acid. The metallic constituents in the solution react with the formed oxalic acid to coprecipitate in a very carefully controlled fashion, which of course is dependent upon the controlled rate of decomposition of the diethyl oxalate.

Preferably there is also added to the solution, prior to precipitation, hydrogen peroxide in amount of at least 0.01 gram mole/gram atom of total metal in the nitrate solution. This enhances the output of the resulting phosphor, as described in the aforementioned copending application, Ser. No. 474,102, filed July 22, 1965.

In preparing the phosphor after the metallic constituents thereof are precipitated as oxalates, it is preferred to fire the raw-mix constituents at a temperature of at least 1000° C. for a period of at least 15 minutes in an atmosphere which comprises oxygen, preferably an air atmosphere, in order to form the phosphor.

The diethyl oxalate can be replaced by dimethyl oxalate or by any other oxalate which is insoluble in aqueous solutions, but which will slowly decompose in the presence of water to form soluble oxalate.

In the preferred mode of practicing the present method, the metallic constituents which comprise the phosphor are incorporated into the solution as nitrates by dissolving the metallic oxides in concentrated nitric acid. This is the preferred method since the nitrates of all of these metals are extremely soluble in water solutions. Any other water-soluble compounds of the indicated metals could be used equally well in place of the nitrates. As an example, the chlorides could be used and this would require dissolving the initial material in hydrochloric acid.

It will be recognized that the objects of the invention have been achieved by providing an improved method for preparing phosphor raw-mix materials by coprecipitating the metallic constituents of the phosphor as oxalates in carefully controlled fashion, which in turn controls the particle size and particle distributions obtainable in the phosphor. In addition, there has been provided a method for producing raw-mix materials which have a minimum of particle agglomerations, with the result that phosphors prepared from these raw-mix materials will also display a minimum of agglomerations.

While best embodiments of the invention have been illustrated and described hereinbefore, it is to be particularly understood that the invention is not limited thereto or thereby.

I claim as my invention:

1. The method of forming raw-mix material for use in preparing a phosphor wherein the formed raw-mix material consists essentially of metal oxalate of at least one of the first group consisting of lanthanum oxalate, yttrium oxalate and gadolinium oxalate, and a small predetermined amount of metal oxalate of at least one of the second group consisting samarium oxalate, europium oxalate, terbium oxalate, dysprosium oxalate, neodymium oxalate, holmium oxalate, erbium oxalate, praseodymium oxalate and thulium oxalate, which method comprises:

(a) forming an aqueous solution of a predetermined amount of compound including the metal component of said first group and a predetermined amount of compound including the metal component of said second group, wherein the relative gram-atom proportion of total metal component of said second group in said solution to the total metal component of said first group in said solution is from 0.005:1 to 0.1:1;

(b) adding to said solution when at a temperature less than 40° C. a predetermined amount of insoluble oxalate which in the presence of water slowly decomposes at relatively elevated temperatures to form soluble oxalate;

(c) raising the solution temperature an amount sufficient to cause said insoluble oxalate to slowly decompose and precipitate at a controlled rate the metallic constituents of said phosphor raw mix as oxalates, and maintaining the solution at the raised temperature until substantially all of the metallic components of said raw mix are precipitated; and (d) drying the precipitate.

2. The method as specified in claim 1, wherein said solution is digested at a temperature of between about 25° C. to 40° C. for at least about two minutes before being heated to higher temperatures to cause said insoluble oxalate to slowly decompose.

3. The method as specified in claim 2, wherein said solution is raised to a temperature of from 40° C. to about 95° C. to cause said insoluble oxalate to slowly decompose.

4. The method as specified in claim 3, wherein said insoluble oxalate is at least one of the group consisting of diethy oxalate and dimethyl oxalate.

5. The method as specified in claim 4, wherein said dissolved compound which includes the metal component of said first group is metallic nitrate, and wherein said dissolved compound which includes the metal component of said second group is metallic nitrate.

6. The method of making a phosphor using the raw mix made by the method as specified in claim 5, wherein the formed raw-mix material is fired at a temperature of at least 1000° C. for a period of at least fifteen minutes in an atmosphere comprising oxygen to form a phosphor.

7. The method of forming raw-mix material for use in preparing a phosphor wherein the formed raw-mix material consists essentially of metal oxalate of at least one of the first group consisting of lanthanum oxalate, yttrium oxalate and gadolinium oxalate, and a small predetermined amount of metal oxalate of at least one of the second group consisting of samarium oxalate, europium oxalate, terbium oxalate, dysprosium oxalate, neodymium oxalate, holmium oxalate, erbium oxalate, praseodymium oxalate and thulium oxalate, which method comprises:

(a) forming an aqueous solution of a predetermined amount of compound including the metal component of said first group and a predetermined amount of compound including the metal component of said second group, wherein the relative gram-atom proportion of total metal component of said second group in said solution to the total metal component of said first group in said solution is from 0.005:1 to 0.1:1;

(b) slowly adding to said solution when at a temperature of from 40° C. to about 95° C. a predetermined amount of insoluble oxalate which in the presence of water slowly decomposes at relatively elevated temperatures to form soluble oxalate to precipitate the metallic constituents of said phosphor raw mix as oxalates; and (c) drying the precipitate.

8. The method as specified in claim 7, wherein said insoluble oxalate is at least one of the group consisting of diethyl oxalate and dimethyl oxalate.

9. The method as specified in claim 8, wherein said dissolved compound which includes the metal component of said first group is metallic nitrate, and wherein said dissolved compound which includes the metal component of said second group is metallic nitrate.

10. The method of making a phosphor using the raw mix made by the method as specified in claim 9, wherein the formed raw-mix material is fired at a temperature of at least 1000° C. for a period of at least fifteen minutes in an atmosphere comprising oxygen to form a phosphor.

References Cited

UNITED STATES PATENTS

| | | | |
|---|---|---|---|
| 3,291,747 | 12/1966 | Lefever et al. | 252—301.4 |
| 3,322,682 | 5/1967 | Thompson | 252—301.4 |

OTHER REFERENCES

Vogel, "A Textbook of Quantitative Inorganic Analysis Including Elementary Instrumental Analysis," third edition, p. 114(c) (1961).

TOBIAS E. LEVOW, *Primary Examiner.*

J. COOPER, *Assistant Examiner.*